June 17, 1941. E. E. WEMP 2,246,156
CLUTCH DRIVEN MEMBER
Filed Aug. 4, 1938
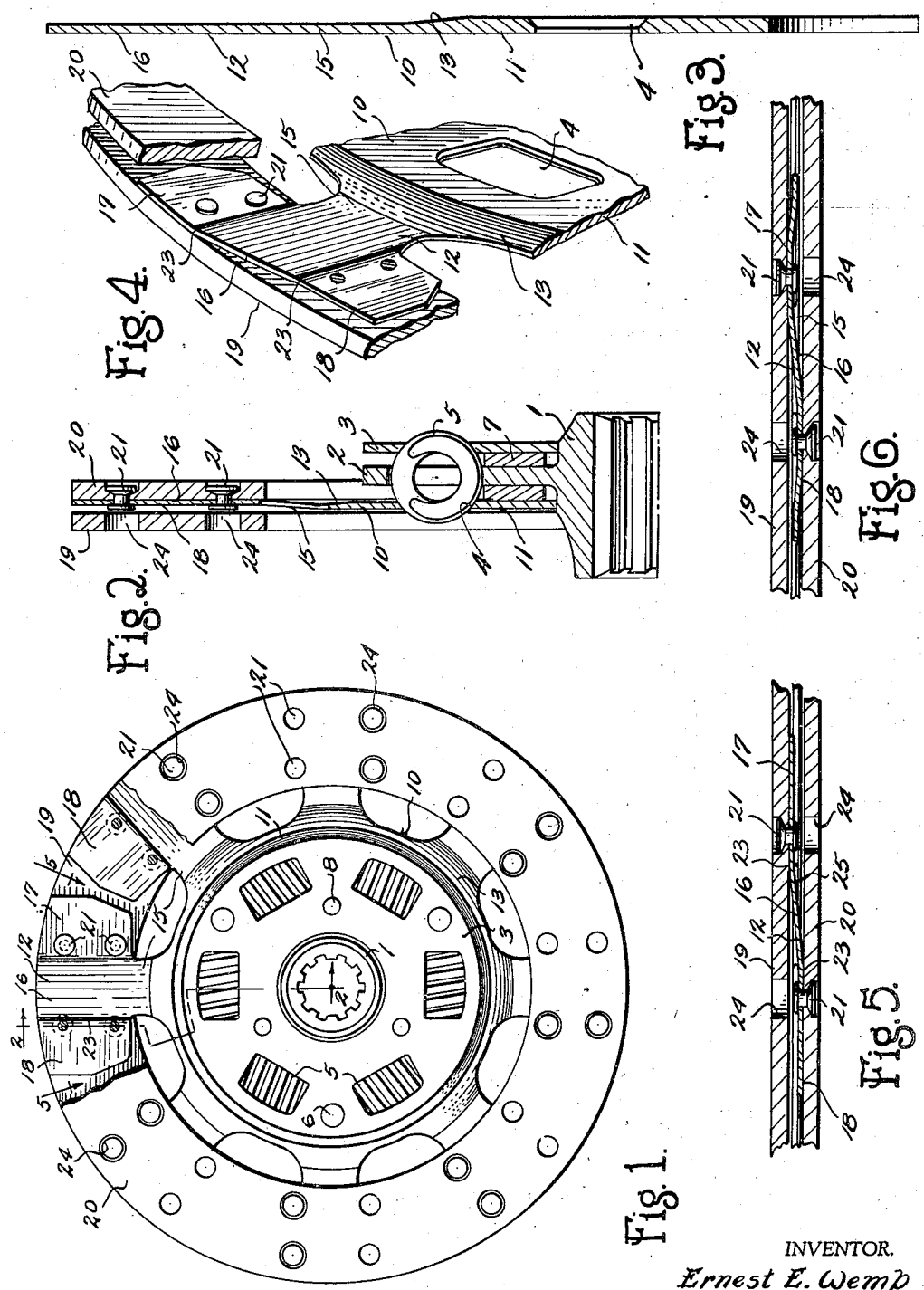
INVENTOR.
Ernest E. Wemp
BY Barnes, Kisselle, Laughlin & Raisch
ATTORNEYS Patented June 17, 1941

2,246,156

UNITED STATES PATENT OFFICE 2,246,156

CLUTCH DRIVEN MEMBER

Ernest E. Wemp, Detroit, Mich.

Application August 4, 1938, Serial No. 222,997

3 Claims. (Cl. 192—107)

This invention relates to a clutch driven member and has to do particularly with improvements in the driven member adapted to be packed between driving members and wherein the driven member is compressible to provide a soft clutching action.

In general, the objects of the invention include the provision of a clutch member which has adequate strength in its central portion for attachment to a hub structure, which hub structure may embody a vibration dampening arrangement, and which has the requisite flexibility in its outer zone for yieldably supporting clutch facings. To this end the member comprises a disc-like body member which is relatively thick in its inner zone for providing requisite strength, etc., and which is relatively thin in its outer zone, and provided in its outer zone with parts which are spaced axially relative to each other for yieldably supporting the clutch facings. Thus in one structural member adequate strength and requisite yieldability is provided. These and other objects will be better understood as the detailed description progresses in conjunction with the accompanying drawing.

Fig. 1 is a plan view of a clutch member constructed in accordance with the invention showing one clutch facing cut away to illustrate underlying structure.

Fig. 2 is a cross sectional view of enlarged form taken substantially on line 2—2 of Fig. 1.

Fig. 3 is a still further enlarged section of the clutch disc.

Fig. 4 is a perspective view of a portion of a clutch disc and facings.

Fig. 5 is an enlarged sectional view taken substantially on line 5—5 of Fig. 1.

Fig. 6 is a view similar to Fig. 5 showing a modified arrangement.

The clutch member illustrated is a driven member which carries friction facings and which is arranged to be packed between clutch driving members. The member, as shown, has a hub 1 arranged to be splined to a driven shaft, and the hub has a flange 2. The attachment of the disc to the hub may follow that structure disclosed in my Patent No. 2,042,570 of June 2, 1936. Briefly, such a structure resides in a washer-like member 3, the washer and flange 2 being provided with openings, and the inner zone of the driven disc is also provided with openings 4 in alignment with those in the flange and washer. Coil springs 5 are situated in the aligned openings. The disc member and washer are connected together for movement in unison through the means of connecting members 6 so that motion is transmitted to and from the flange of the hub through the annulus of coil springs. This movement may be controlled frictionally by friction means 7 acting between the hub flange and the disc and washer, and held in place by rivets 8. This is one form of hub structure, all as fully described in my aforesaid patent and need not be further considered in detail.

The body of the driven member takes the form of a disc generally indicated at 10 which has an inner zone 11 which is relatively thick and an outer zone 12 which is relatively thin. This differential in thickness may be obtained in different ways and one way is that of selecting a disc having an initial thickness corresponding to the desired thickness of the inner zone and then grinding the outer zone down to the desired thickness. Preferably, the grinding is accomplished so that there is not an abrupt change but so that there is a rather gradual change in thickness as indicated by the beveled part 13. The shape of the grinding wheels accomplishes this.

As shown herein the outer zone of the disc is in the form of T-head spokes. Each spoke has a neck portion 15 in alignment with the central portion 16 and the neck and central portion are twisted, so to speak, relative to the plane of the disc so that opposite ends of the cross bar of the T are offset axially relative to each other. The ends of the cross bar constitute, in effect, wings 17 and 18 offset as shown in Figs. 5 and 6, and one facing 19 is connected to the wings offset on one side of the plane of the disc while another facing 20 is secured to the wings offset to the other side. Such connection preferably takes the form of rivets 21, and the point of connection is preferably at the high point next adjacent the bend line 23 between the angular central portion and the wings. Each facing is preferably provided with apertures 24 for accommodating the rivet heads of the other facing.

As shown in Fig. 5, the wings 17 and 18 may be disposed so as to lie flush against the facings, or in other words in planes parallel to the plane of the disc. However, these wings may be fashioned to project toward the opposite facing as shown in Fig. 6. In the operation of the clutch the first collapsing action, upon initial clutch engagement, is a torsion action in which the portions 16 of the spokes are twisted. When the extreme edges of the wings come into contact with the opposite facing there is a bending action tending to straighten out the heads of the spokes on the bend lines 23. This same action takes place in both forms except that the ends of the heads of the spokes in Fig. 6 come into contact with the opposite facing at an earlier stage of clutch engagement. The Fig. 6 form may be varied by varying the distance which the wings or ends of the heads project toward the opposite facing, and indeed the spoke wings may be fashioned to extend across the plane of the disc and into contact with the opposite facing.

It will therefore be seen that a clutch member is provided having an inner zone of adequate metal stock and strength for providing the driving connection with the hub. As shown herein, the central zone transmits the driving forces through the coil springs and the force is delivered through the edges of the stock defining the openings. The stock width is adequate for this purpose. At the same time the outer zone is of thinner stock to provide requisite flexibility and a reduction of that stiffness which would be present if the stock in the outer zone were as thick as that used in the inner zone.

Thus, even though the clutch member comprises a body of a single disc-like member, the relatively heavy cross section of metal in the inner zone provides adequate strength and the relatively light cross section of metal in the outer zone provides the requisite softness and yieldability.

I claim:

1. A clutch member comprising, a disc-like member having an inner zone for connection to hub means and having an outer zone for connection to clutch facings, said inner zone being of relatively thick stock, the outer zone being of relatively thin stock and comprised of spokes disposed angularly relative to the plane of the disc with the spokes extending radially inwardly from the zone of the facings and having axially spaced parts for yieldingly supporting said facings relative to each other.

2. A clutch member comprising, a disc-like member having an inner zone for connection to hub means and having an outer zone for connection to clutch facing rings, said inner zone being of relatively thick stock and the outer zone being of relatively thin stock, said outer zone comprising T-shaped spokes with the vertical bar of each spoke angularly disposed relative to the plane of the disc and with the opposite arms of the cross bar of each spoke being axially spaced for yieldingly supporting the clutch facings, the spokes extending radially inwardly of the zone of the facing rings.

3. A clutch driven member comprising, a hub having a flange with openings therein, a disc member, the inner zone of the disc member being relatively thick and having openings therein aligned with the openings in the flange, coil springs in the aligned openings for establishing a driving connection between the disc and hub, the outer zone of the disc being relatively thin and comprising spokes, each having circumferentially extending wings at its end, each spoke being angularly disposed so that the wings thereof are axially spaced from each other, a facing on each side of the wings, one facing being connected to some of the wings and the other facing being connected to wings axially spaced from the wings connected to the said one facing.

ERNEST E. WEMP.